United States Patent
Jürgens et al.

(10) Patent No.: US 7,232,978 B2
(45) Date of Patent: Jun. 19, 2007

(54) METHOD FOR CONTROLLING A DELTA-T COOKING PROCESS

(75) Inventors: Andrea Jürgens, Kirchheim (DE); Judith Imgram, Hanau (DE); Katrin Lauterbach, Landsberg (DE); Kathrin Hildenbrand, Untermeitingen (DE); Roland Sterzel, Frankfurt (DE); Michael Greiner, Landsberg (DE); Jürgen Klasmeier, Landsberg (DE)

(73) Assignee: Rational AG, Landsberg/Lech (DE)

( * ) Notice: Subject to any disclaimer, the term of this patent is extended or adjusted under 35 U.S.C. 154(b) by 0 days.

(21) Appl. No.: 11/208,067

(22) Filed: Aug. 19, 2005

(65) Prior Publication Data

US 2006/0049187 A1    Mar. 9, 2006

(30) Foreign Application Priority Data

Aug. 20, 2004    (DE) .................. 10 2004 040 655

(51) Int. Cl.
*H05B 6/50* (2006.01)
*H05B 6/64* (2006.01)

(52) U.S. Cl. ...................... 219/710; 219/678
(58) Field of Classification Search ............... 219/710, 219/711, 712, 678, 702, 704, 713
See application file for complete search history.

(56) References Cited

U.S. PATENT DOCUMENTS 5,877,477 A * 3/1999 Petty et al. ............... 219/506
6,232,587 B1 * 5/2001 Kurita et al. ............. 219/682
6,563,097 B2 * 5/2003 Taino et al. .............. 219/711
6,753,027 B1   6/2004 Greiner et al.
2002/0162836 A1 * 11/2002 Taino et al. .............. 219/710
2006/0049187 A1 * 3/2006 Jurgens et al. ........... 219/710

FOREIGN PATENT DOCUMENTS

| DE | 199 45 021 A1 | 12/2001 |
| EP | 0 723 115 A2 | 7/1996 |
| EP | 1 445 677 A2 | 8/2004 |

\* cited by examiner

*Primary Examiner*—Daniel Robinson
(74) *Attorney, Agent, or Firm*—Marshall, Gerstein & Borun LLP

(57) ABSTRACT

A method for controlling a delta-T cooking process includes (a) selecting of a set core temperature $KT_s$ and a delta-T value for the food to be cooked, (b) introducing the food to be cooked into the cooking space at an initial core temperature $KT_0$; (c) increasing the actual cooking space temperature $GT_a$ as a function of the actual core temperature $KT_a$ over the course of at least one first time interval in such a way that an essentially constant difference approximately on the order of magnitude of the delta-T value is maintained between $GT_a$ and $KT_a$ until $KT_a = KT_s + A$ and thus corresponds to a maximum value $GT_{a-r}$, where A is a temperature value smaller than delta-T; and finally (d) stepwise and/or continuously decreasing the actual cooking space temperature $GT_a$ during a second time interval to a final cooking space temperature of $GT_e = KT_s + B$, where B is a temperature value of $0 \leq B < A$, in such a way that, when $GT_a$ becomes essentially the same as $GT_e$, $KT_a$ reaches $KT_s$ more-or-less simultaneously.

25 Claims, 2 Drawing Sheets

METHOD FOR CONTROLLING A DELTA-T COOKING PROCESS

RELATED APPLICATION

This application is related to and claims priority under 35 U.S.C. § 119 to German Application Serial No. DE 10 2004 040 655.3 which was filed on Aug. 20, 2004, the disclosure of which is hereby expressly incorporated by reference herein.

TECHNICAL FIELD

The present application pertains to a method for controlling a delta-T cooking process and to a cooking appliance in which a method of this type can be implemented.

BACKGROUND ART

A method of the general type in question for controlling delta-T cooking processes is known to one skilled in the art. A description of so-called "delta-T cooking" can be found, for example, at the web sites http://home.tele-net-zh/convotherm/faq.asp and http://hobart.de/kuechentechnik/gartechnik/anwend/braten/htm of the companies Convotherm and Hobart. By this method, the food to be cooked is cooked very carefully in the sense that the difference between the cooking space temperature and the core temperature is maintained at a certain value at all times until the desired set core temperature of the food to be cooked is reached. According to the delta-T cooking method used in the past, therefore, the cooking space temperature is higher than the actual core temperature by the delta-T value. The difference between the actual core temperature and the actual cooking space temperature can be monitored automatically during the cooking time, and a cooking profile can be set up for each type of food to be cooked.

A modification of the delta-T method for use in cooking frozen or deep-frozen products is described in EP 1,445,677 A2.

A method consisting of several phases for cooking meat is described in EP 0,723,115 A2. To carry out this method, a cook specifies a desired cooking time and a desired final temperature of the cooked food. In a first, optional, grilling phase, the cooking space temperature is brought to a value of approximately 250° C. and held automatically at this value. Then the cooking space temperature is lowered to a second value, which is slightly above the final desired temperature of the food being cooked. As soon as the temperature of the food being cooked is within 15° C. of the desired final temperature, the cooking space temperature is no longer regulated, and instead the temperature of the food being cooked is regulated, namely, in such a way that it increases linearly with time and reaches the desired end value precisely at the end of the cooking time.

A method for controlling a cooking process in which a cooking process sensor takes into account the cooking kinetics of the food item to be cooked is known from DE 199 45 021 A1.

In general, the very careful delta-T cooking method has a very positive effect both on products which require only a very short cooking time and on those which require a very long cooking time. Nevertheless, unsatisfactory sensory results are still obtained regularly when the item to be cooked is of large diameter, when a relatively large delta-T value is maintained, or when large amounts are being cooked at once. It has been found, however, that, even when the cooking space temperature is lowered to the set core temperature, as soon as the set core temperature of the food is reached, the food product can still be overcooked and suffer an unnecessary loss of weight, juiciness, and color.

SUMMARY OF THE DISCLOSURE

The task of the disclosed cooking method is therefore to eliminate the disadvantages of the delta-T cooking process of the general type in question and to improve this process in such a way that a food product to be cooked can be cooked reliably and reproducibly and so that superior sensory values can be obtained without the risk of overcooking.

In particular, a method for controlling a delta-T cooking process includes the steps of (a) selecting a set core temperature $KT_s$ and a delta-T value for the food to be cooked; b) introducing the food to be cooked into the cooking space at an initial core temperature $KT_0$; (c) increasing the actual cooking space temperature $GT_a$ as a function of the actual core temperature $KT_a$ over the course of at least one first time interval in such a way that an essentially constant difference approximately on the order of magnitude of the delta-T value is maintained between $GT_a$ and $KT_a$ until $GT_a = KT_s + A$ and thus corresponds to a maximum value $GT_{a-r}$, where A is a temperature value smaller than delta-T; and finally, (d) stepwise and/or continuously decreasing the actual cooking space temperature $GT_a$ during a second time interval to a final cooking space temperature $GT_a = KT_s + B$, where B is a temperature value of $0 \leq B < A$, in such a way that, when $GT_a$ becomes essentially the same as $GT_e$, $KT_a$ reaches $KT_s$ more-or-less simultaneously.

The cooking method may be characterized in that the parameter A assumes a value in the range of 1 to 30° C., especially of 2 to 20° C., and in that the parameter B assumes a value in the range of 1 to 20° C., especially of 2 to 10° C.

Additionally, a method for controlling a delta-T cooking process includes (a) selecting a set core temperature $KT_s$ and a delta-T value for the food to be cooked; (b) introducing the food to be cooked into the cooking space at an initial core temperature $KT_0$; (c) increasing the actual cooking space temperature $GT_a$ as a function of the actual core temperature $KT_a$ over the course of at least one first time interval in such a way that an essentially constant difference approximately on the order of magnitude of the delta-T value is maintained between $GT_a$ and $KT_a$ until $KT_a$ reaches approximately the value according to the following formula:

$$KT_s - 0.5 \cdot \text{delta-}T + 0.5 \cdot X$$

and thus corresponds to the value $KT_{a-r}$, where X is a temperature value smaller than delta-T; and finally, (d)(i) stepwise and/or continuously decreasing the actual cooking space temperature $GT_a$ during a second time interval to a final cooking space temperature $GT_e = KT_s + B$, where B is a temperature value of $0 \leq B < X$, in such a way that, when $GT_a$ becomes essentially the same as $GT_e$, $KT_a$ reaches $KT_s$ more-or-less simultaneously; or (d)(ii) decreasing the actual cooking space temperature $GT_a$ during a second time interval until $KT_a$ is essentially the same as $KT_s$.

This method may be characterized in that, in step (d)(ii), the actual cooking space temperature $GT_s$ is adjusted during the second time interval essentially to a cooking space temperature setting $GT_s$ according to the following formula:

$$GT_s = 2 \cdot KT_s - KT_a + X.$$

This method may be also be characterized in that, once $KT_a$ has essentially reached $KT_s$ in step (d), $GT_a$ and/or $GT_e$ is/are decreased to the set core temperature $KT_s$.

Likewise, any of these methods may be characterized in that the temperature value X has a value in the range of 1 to 20° C., especially of 2 to 15° C., and in that the temperature value B has a value in the range of 1 to 15° C., especially of 2 to 10° C. Additionally, any of these methods may be characterized in that at least the actual cooking space temperature $GT_a$ is controlled manually, automatically, or semi-automatically by an open-loop and/or a closed-loop controller, especially with the use of a cooking process sensor comprising at least one tip which can be introduced at least part of the way into the food to be cooked, preferably by the use of a handle, which tip has at least one, and preferably four, temperature sensors.

Any of the previous methods may be characterized in that the delta-T value, the set core temperature $KT_s$, and/or the temperature values X or A are calculated as a function of at least one variable of the food to be cooked such as its weight, type, density, dimensions, diameter, degree of maturity, pH value, storage condition, consistency, odor, desired degree of browning and crust formation, thermal conductivity, taste, quality, hygiene, initial core temperature $KT_0$, initial edge zone temperature $RT_0$, and/or initial surface temperature $OT_0$. Any of these methods may be characterized in that meat, especially ham, smoked meat, and/or pickled meat is selected as the food to be cooked. In one embodiment, the disclosed method is preferably used for producing or cooking boiled ham.

For the disclosed method to be successful, it is not absolutely necessary for the temperature parameters used to be maintained with total precision at all times. One skilled in the art is quite familiar with the fact that these temperature parameters are subject to tolerances in the range of ±3° C., for example, as a function of, for example, the size of the cooking space or of the cooking appliance used.

The task on which the cooking method is based may be accomplished by a cooking appliance with a cooking space, which includes at least one cooking process sensor, especially a core temperature sensor, for picking up the core temperature of at least one item to be cooked and a control unit for the automatic guiding of the cooking process. The control unit receives as its input signal the output signal of the cooking process sensor, and the control unit is configured to control the cooking process in accordance with any of the methods described above.

The cooking appliance may include a unit for the input and storage of parameter values pertaining to the food to be cooked and/or the cooking process, where the control unit uses one or more of these parameter values as input variables for the control of the cooking process. Additionally, the cooking appliance may be characterized in that a set core temperature $KT_s$; a delta-T value; a parameter A, B, and/or X; and/or a final cooking space temperature $GT_e$ can be entered.

With the use of the modified delta-T cooking method, it is possible to obtain an optimal cooking result reliably and reproducibly even when the item to be cooked is very large. The overcooking of food and thus impairments to the cooked food such as shrinkage, dryness, and unattractive color can be excluded with very high reliability even when large amounts of food are being cooked. The cooking appliances can therefore be operated successfully even by nonprofessionals and can be used even for complicated cooking processes. In particular, the amount of heat required can be supplied and/or the optimal temperature curve can be selected for each product to be cooked in a product-specific manner and under consideration of the number of products to be cooked, of their total and/or individual weight, and/or of their moisture content.

BRIEF DESCRIPTION OF THE DRAWINGS

Additional features and advantages of the disclosed method can be derived from the following description, in which an embodiment of a cooking process is explained by way of example on the basis of drawings.

DETAILED DESCRIPTION

Figure 1:
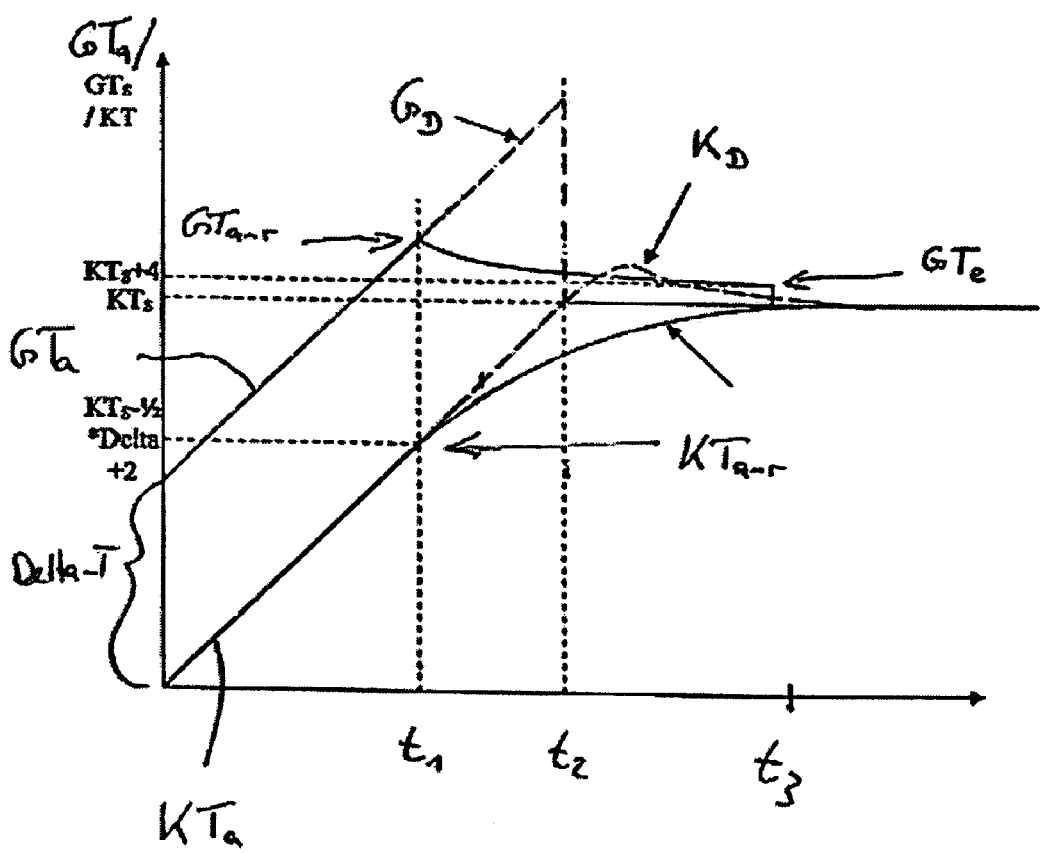
FIG. 1 shows a temperature-versus-time diagram, not to scale, of a cooking process.
Figure 2:
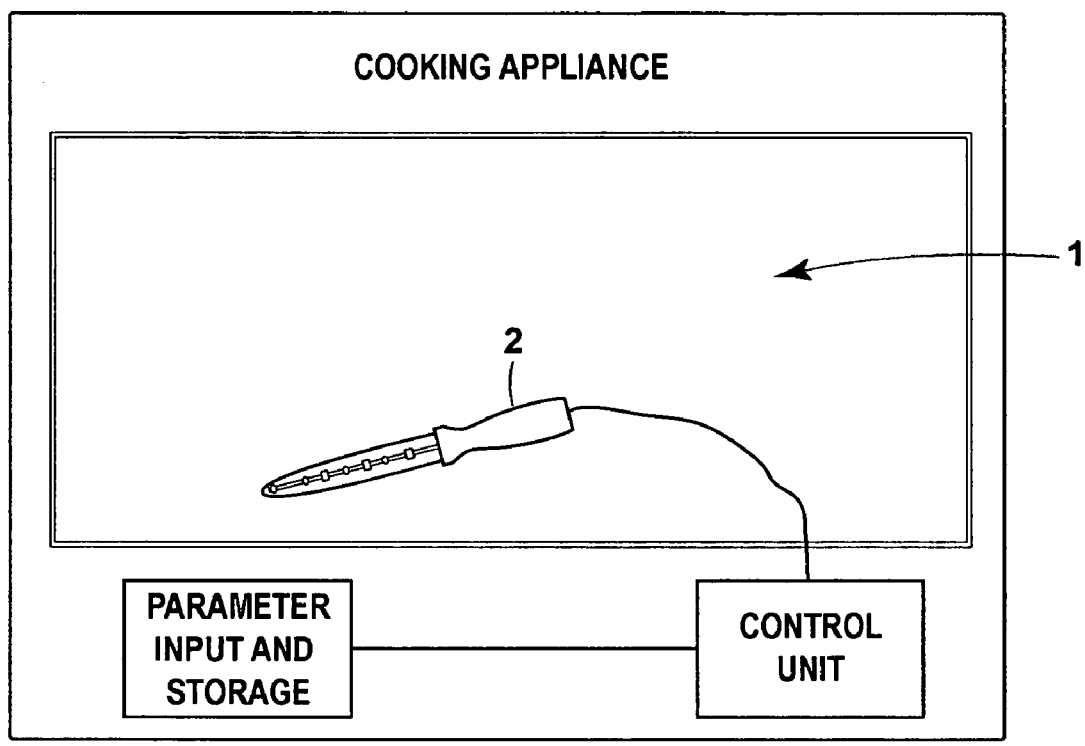
FIG. 2 shows a block diagram of a cooking appliance and a cooking process sensor which implements the cooking method described herein.

As can be seen in FIGS. 1 and 2, a food product to be cooked (not shown) with an actual core temperature $KT_a$ is located in a cooking space 1 (FIG. 2) with an actual cooking space temperature $GT_a$. The heating of the food to be cooked, i.e., the change in the core temperature of the food to be cooked, can be detected and monitored by means of, for example a cooking process sensor 2 such as that described in DE 199 45 021 A (U.S. Pat. No. 6,753,027), the disclosures of which is hereby incorporated by reference herein, and which includes at least one and preferably four temperature sensors disposed thereon. As long as the actual core temperature $KT_a$ has still not reached the value $KT_{a-r}$ at $t_1$, the actual cooking space temperature $GT_a$ is adjusted in such a way that an essentially constant delta-T value is always maintained between $GT_a$ and $KT_a$. In conventional cooking appliances, the actual cooking space temperature $GT_a$ in the cooking space reaches the desired cooking space temperature $GT_s$ set on the cooking appliance in a very short time, usually within a few seconds, even when the temperature disparity is large. For this reason, it is possible for common applications to consider the desired cooking space temperature $GT_s$, which can be either controlled automatically or set manually, equivalent to the actual cooking space temperature $GT_a$ present inside the cooking space. As soon as the actual cooking space temperature $GT_a$ exceeds the set core temperature $KT_s$ and the current or actual core temperature $KT_a$ assumes the value $$KT_{a-r} = KT_s - 0.5 \text{ delta-T} + 0.5 \cdot X,$$

the actual cooking space temperature $GT_a$ is not increased any further in the embodiment shown here. To the contrary, after it passes through a maximum value $GT_{a-r}$, it is slowly lowered toward the set core temperature $KT_s$. After $KT_{a-r}$ is reached, the actual cooking space temperature $GT_a$ is regulated as a function of the actual core temperature $KT_a$, which is still rising continuously, in such a way that the course of this cooking space temperature essentially obeys, that is, obeys under consideration of the conventional tolerances, the following equation:

$$GT_a = 2 \cdot KT_s - KT_a + X.$$

The actual cooking space temperature $GT_a$ is lowered according to the previously mentioned equation toward a cooking space temperature $GT_e$ until the actual core temperature $KT_a$ corresponds to the set core temperature $KT_s$. As soon as this latter event has occurred, the cooking space temperature $GT_e$ is lowered to the set core temperature $KT_s$ at $t_3$ and possibly held at this value.

The additional parameter X is provided to prevent the set core temperature $KT_s$ from being reached too slowly. It is not critical for the inventive cooking result if the value X causes the actual core temperature $KT_a$ to overshoot the set core temperature $KT_s$ slightly (an overshoot of, for example, approximately 1 to 2 K). An especially suitable value for X is, for example, 4, which is the value used in FIG. 1. By the use of the disclosed cooking method, the delta-T value is reduced as a function of the difference between the actual core temperature $KT_a$ and the set core temperature.

For comparison with the disclosed cooking process, the temperature curves of the core temperature (curve $K_D$) and of the actual cooking space temperature (curve $G_D$) during a cooking process by the conventional delta-T method are also shown in FIG. 1 in broken line. In these conventional delta-T cooking processes, the delta-T temperature gap is maintained until the actual core temperature $KT_a$ corresponds to the set core temperature $KT_s$. Only at this point is the cooking space temperature abruptly lowered to the set core temperature $KT_s$ and held there. As a result of the energy already in the cooking space at this time and the energy already introduced into the product being cooked, the core temperature rises above the preferred set core temperature in spite of the abrupt reduction of the cooking space temperature and returns to the set core temperature $KT_s$ only after a long time. This overcooking effect, which pertains especially to the outer areas of the food being cooked, is especially pronounced when an especially large delta-T value is selected, because this is also associated with a large temperature gradient in the interior of the food being cooked.

By the use of the disclosed method, it is possible to maintain delta-T cooking for the longest possible time without simultaneously running the risk of overcooking the food. The time at which the reduction of the actual cooking space temperature begins is thus dependent on the selected delta-T value.

The described process ensures that, the larger the selected delta-T value, the earlier the point at which the cooking space temperature begins to be lowered. Once the lowering of the cooking space temperature begins in the second phase of the process, the delta-T value decreases more and more as the actual core temperature $KT_a$ approaches the set core temperature $KT_s$.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method for controlling a delta-T cooking process, comprising:
   (a) selecting a set core temperature $KT_s$ and a delta-T value for the food to be cooked;
   (b) introducing the food to be cooked into a cooking space at an initial core temperature $KT_0$;
   (c) increasing an actual cooking space temperature $GT_a$ as a function of an actual core temperature $KT_a$ over the course of at least one first time interval in such a way that an essentially constant difference approximately on the order of magnitude of the delta-T value is maintained between $GT_a$ and $KT_a$ until $GT_a = KT_s + A$ and thus corresponds to a maximum value $GT_{a-r}$, where A is a temperature value smaller than delta-T; and
   (d) stepwise and/or continuously decreasing the actual cooking space temperature $GT_a$ during a second time interval to a final cooking space temperature $GT_e = KT_s + B$, where B is a temperature value of $0 \leq B < A$, in such a way that, when $GT_a$ becomes essentially the same as $GT_e$, $KT_a$ reaches $KT_s$ substantially simultaneously.

2. The method according to claim 1, wherein the temperature value A assumes a value in the range of 1 to 30° C. and the temperature value B assumes a value in the range of 1 to 20° C.

3. The method according to claim 2, wherein the temperature value A assumes a value in the range of 2 to 20° C.

4. The method according to claim 2, wherein the temperature value B assumes a value in the range of 2 to 10° C.

5. The method according to claim 1, wherein the actual cooking space temperature $GT_a$ is controlled manually, automatically, or semi-automatically by an open-loop and/or a closed-loop controller.

6. The method according to claim 5, wherein the actual cooking space temperature $GT_a$ is controlled with the use of a cooking process sensor comprising at least one tip which can be introduced at least part of the way into the food to be cooked.

7. The method according to claim 6, wherein the cooking process sensor includes a handle which can be used, to introduce the tip at least part of the way into the food to be cooked.

8. The method according to claim 6, wherein the tip has at least one temperature sensor.

9. The method according to claim 6, wherein the tip has at least four temperature sensors.

10. The method according to claim 1, wherein the delta-T value, the set core temperature $KT_s$, and/or the temperature value A is/are calculated as a function of at least one variable of the food to be cooked such as its weight, type, density, dimension, diameter, degree of maturity, pH value, storage condition, consistency, odor, desired degree of browning and crust formation, thermal conductivity, taste, quality, hygiene, initial core temperature $KT_0$, initial edge zone temperature $RT_0$, and/or initial surface temperature $0T_0$.

11. A method for controlling a delta-T cooking process, comprising:
   (a) selecting a set core temperature $KT_s$ and a delta-T value for the food to be cooked;
   (b) introducing the food to be cooked into a cooking space at an initial core temperature $KT_0$;
   (c) increasing an actual cooking space temperature $GT_a$ as a function of an actual core temperature $KT_a$ over the course of at least one first time interval in such a way that an essentially constant difference approximately on the order of magnitude of the delta-T value is maintained between $GT_a$ and $KT_a$ until $KT_a$ reaches approximately a value according to the following formula: $KT_s - 0.5 \cdot \text{delta-T} + 0.5 \cdot X$ and thus corresponds to a value $KT_{a-r}$, where X is a temperature value smaller than delta-T; and
   (d)(i) stepwise and/or continuously decreasing the actual cooking space temperature $GT_a$ during a second time interval to a final cooking space temperature $GT_e = KT_s + B$, where B is a temperature value of $0 \leq B < X$, in such a way that, when $GT_a$ becomes essentially the same as $GT_e$, $KT_a$ reaches $KT_s$ substantially simultaneously; or
   (d)(ii) decreasing the actual cooking space temperature $GT_a$ during a second time interval until $KT_a$ is essentially the same as $KT_s$.

12. The method according to claim 11, wherein, in step (d)(ii), the actual cooking space temperature $GT_s$ is adjusted during the second time interval essentially to a cooking space temperature setting $GT_s$ according to the following formula:

$$GT_s = 2 \cdot KT_s + X.$$

13. The method according to claim 11, wherein once $KT_a$ has essentially reached $KT_s$ in step (d), $GT_a$ and/or $GT_e$ is/are decreased to the set core temperature $KT_s$.

14. The method according to claim 11, wherein the temperature value X has a value in the range of 1 to 20° C., and the temperature value B has a value in the range of 1 to 15° C.

15. The method according to claim 14, wherein the temperature value X has a value in the range of 2 to 15° C.

16. The method according to claim 14, wherein the temperature value B has a value in the range of 2 to 10° C.

17. The method according to claim 11, wherein the actual cooking space temperature $GT_a$ is controlled manually, automatically, or semi-automatically by an open-loop and/or a closed-loop controller.

18. The method according to claim 17, wherein the actual cooking space temperature $GT_a$ is controlled with the use of a cooking process sensor comprising at least one tip which can be introduced at least part of the way into the food to be cooked.

19. The method according to claim 18, wherein the cooking process sensor includes a handle which can be used to introduce the tip at least part of the way into the food to be cooked.

20. The method according to claim 18, wherein the tip has at least one temperature sensor.

21. The method according to claim 18, wherein the tip has at least four temperature sensors.

22. The method according to claim 11, wherein the delta-T value, the set core temperature $KT_s$, and/or the temperature value X is/are calculated as a function of at least one variable of the food to be cooked such as its weight, type, density, dimensions, diameter, degree of maturity, pH value, storage condition, consistency, odor, desired degree of browning and crust formation, thermal conductivity, taste, quality, hygiene, initial core temperature $KT_0$, initial edge zone temperature $RT_0$, and/or initial surface temperature $OT_0$.

23. The method according to claim 11, wherein meat is selected as the food to be cooked.

24. The method according to claim 23, wherein the meat is selected from the group consisting of ham, smoked meat, and pickled meat.

25. A method for controlling a delta-T cooking process, comprising:
   (a) selecting a set core temperature $KT_s$ and a delta-T value for the food to be cooked;
   (b) introducing the food to be cooked into a cooking space at an initial core temperature $KT_0$; and either
   (c) increasing an actual cooking space temperature $GT_a$ as a function of an actual core temperature $KT_a$ over the course of at least one first time interval in such a way that an essentially constant difference approximately on the order of magnitude of the delta-T value is maintained between $GT_a$ and $KT_a$ until $GT_a = KT_s + A$ and thus corresponds to a maximum value $GT_{a-r}$, where A is a temperature value smaller than delta-T; and
   (d) stepwise and/or continuously decreasing the actual cooking space temperature $GT_a$ during a second time interval to a final cooking space temperature $GT_e = KT_s + B$, where B is a temperature value of $0 \leq B < A$, in such a way that, when $GT_a$ becomes essentially the same as $GT_e$, $KT_a$ reaches $KT_s$ substantially simultaneously; or
   (c') increasing an actual cooking space temperature $GT_a$ as a function of an actual core temperature $KT_a$ over the course of at least one first time interval in such a way that an essentially constant difference approximately on the order of magnitude of the delta-T value is maintained between $GT_a$ and $KT_a$ until $KT_a$ reaches approximately a value according to the following formula: $KT_s - 0.5 \cdot \text{delta-T} + 0.5 \cdot X$ and thus corresponds to a value $KT_{a-r}$, where X is a temperature value smaller than delta-T; and
   (d')(i) stepwise and/or continuously decreasing the actual cooking space temperature $GT_a$ during a second time interval to a final cooking space temperature $GT_e = KT_s + B$, where B is a temperature value of $0 \leq B < X$, in such a way that, when $GT_a$ becomes essentially the same as $GT_e$, $KT_a$ reaches $KT_s$ substantially simultaneously; or (d'')(ii) decreasing the actual cooking space temperature $GT_a$ during a second time interval until $KT_a$ is essentially the same as $KT_s$.

* * * * *